United States Patent
Kamath et al.

(10) Patent No.: US 9,950,387 B2
(45) Date of Patent: Apr. 24, 2018

(54) PLASMA TORCH POWER CIRCUIT AND COOLING SYSTEM

(71) Applicant: Hypertherm, Inc., Hanover, NH (US)

(72) Inventors: Girish R. Kamath, Lebanon, NH (US); Brian J. Currier, Newport, NH (US); Boris Mandadzhiev, Melrose, MA (US)

(73) Assignee: Hypertherm, Inc., Hanover, NH (US)

(*) Notice: Subject to any disclaimer, the term of this patent is extended or adjusted under 35 U.S.C. 154(b) by 1224 days.

(21) Appl. No.: 14/057,104

(22) Filed: Oct. 18, 2013

(65) Prior Publication Data

US 2014/0110380 A1    Apr. 24, 2014

Related U.S. Application Data

(60) Provisional application No. 61/715,729, filed on Oct. 18, 2012.

(51) Int. Cl.
*B23K 10/00* (2006.01)
*H05H 1/36* (2006.01)

(52) U.S. Cl.
CPC ............ *B23K 10/006* (2013.01); *B23K 10/00* (2013.01); *H05H 1/36* (2013.01)

(58) Field of Classification Search
CPC ........................................ B23K 10/00–10/027
USPC ............................ 219/108, 110, 116, 121.11, 219/121.36–121.59, 137.63
See application file for complete search history.

(56) References Cited

U.S. PATENT DOCUMENTS

| | | | | |
|---|---|---|---|---|
| 4,371,775 A | * | 2/1983 | Mihara | B23K 10/02 219/121.45 |
| 6,072,163 A | * | 6/2000 | Armstrong | H01L 21/67103 118/724 |
| 6,153,851 A | | 11/2000 | Schneider | |

(Continued)

FOREIGN PATENT DOCUMENTS

| | | |
|---|---|---|
| CN | 202026245 U | 11/2011 |
| EP | 0892422 A2 | 1/1999 |
| WO | 2010036666 A2 | 1/2010 |

OTHER PUBLICATIONS

International Search report Issued in PCT/US2013/065569, dated Mar. 19, 2014.

*Primary Examiner* — Michael LaFlame, Jr.
(74) *Attorney, Agent, or Firm* — Proskauer Rose LLP

(57) ABSTRACT

A plasma arc cutting system includes a power supply comprising a multi-pulse transformer and a plurality of semiconductor switches directly connected to a bank of capacitors, and a thermal regulation system connected to the power supply and configured to cool the multi-pulse transformer. The thermal regulation system includes a cold plate in direct contact with the semiconductor switches; a fluid conduit disposed within the cold plate; and a pump connected to the conduit and configured to direct a coolant fluid through the conduit. The power supply has at least one of the following operating requirements: (i) a weight to power ratio of approximately 22.4 pounds per kilowatt; (ii) a volume to power ratio of approximately 1366 cubic inches per kilowatt; (iii) an average semiconductor device case temperature of approximately 100 degrees Centigrade during a cutting operation; (iv) a maximum transformer temperature of about 133 degrees Centigrade during a cutting operation.

13 Claims, 5 Drawing Sheets

(56) References Cited

U.S. PATENT DOCUMENTS

| | | | |
|---|---|---|---|
| 6,300,589 B1 | 10/2001 | Reynolds et al. | |
| 6,359,251 B1 | 3/2002 | Picard et al. | |
| 7,470,872 B2 * | 12/2008 | Griffin | H05H 1/28 219/121.39 |
| 2004/0094528 A1 * | 5/2004 | Manthe | B23K 9/1056 219/130.21 |

* cited by examiner

PLASMA TORCH POWER CIRCUIT AND COOLING SYSTEM

CROSS-REFERENCE TO RELATED APPLICATION

This application claims the benefit of U.S. Provisional Patent Application No. 61/715,729, which was filed on Oct. 18, 2012 and entitled "Plasma Torch Power Circuit and Cooling System," the entire contents of which are hereby incorporated herein by reference.

FIELD OF THE INVENTION

The invention relates generally to the field of plasma cutting systems and processes. More specifically, the invention relates to methods and apparatuses for providing power and cooling to plasma cutting systems using fewer component parts, requiring less bulk and/or reducing design complexity.

BACKGROUND

Plasma arc torches are widely used in the cutting and marking of materials. A plasma torch generally includes an electrode and a nozzle having a central exit orifice mounted within a torch body, electrical connections, passages for cooling, and passages for arc control fluids (e.g., plasma gas). The torch produces a plasma arc, a constricted ionized jet of a gas with high temperature and high momentum. Gases used in the torch can be non-reactive (e.g., argon or nitrogen) or reactive (e.g., oxygen or air). During operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

Known power circuits and associated cooling systems for plasma cutting systems require numerous hardware components. For example, existing power circuits include four insulated gate bipolar transistors (IGBTs); eight direct current (DC) bus capacitors; six power resistors; four fans; two heat sinks; two DC bus capacitor support plates; and/or four printed circuit board (PCB) assemblies. These known technologies introduce significant bulk and/or complexity into the power supply design in terms of the power supplied per unit mass, the power supplied per unit volume, and/or a temperature of the power supply during operation.

SUMMARY OF THE INVENTION

The present invention addresses the unmet need for a plasma arc torch power supply by reducing bulk and/or design complexity while providing similar or greater (i) power output per unit mass of the power supply and/or (ii) power output per unit volume of the power supply. The present invention also achieves a lower average case temperature for the power supply during operation as compared with known power supplies. In one implementation, the current invention includes two IGBTs instead of four; four DC bus capacitors instead of eight; three power resistors instead of six; zero fans for the power circuit instead of four; one cold plate instead of two heat sinks; one DC bus capacitor support plate instead of two; and one PCB assembly instead of four. As a result the power supply delivers greater power output per unit mass and/or per unit volume while maintaining a lower average case temperature during operation.

In some embodiments, the cold plate can improve cooling of the power supply, reduce component requirements, and/or improve power performance. In some embodiments, a multi-pulse transformer is used. The multi-pulse transformer can help to meet or exceed power quality standards as defined by power factor benchmarks and benchmarks for total harmonic distortion (THD) of input current. In some embodiments, a fan and/or a set of baffles are oriented to cool the multi-pulse transformer and/or a set of output inductors. The fan and/or baffles can improve cooling and allow for a reduction in size and weight reduction of magnetic components.

In some embodiments, separate choppers in the power circuit are electrically connected to distinct inductors. In some embodiments, the choppers are wired directly to a single bank of capacitors. In some embodiments the choppers operate in an interleaved mode. Operating in interleaved mode using a single bank of capacitors can result in a significant reduction in the capacitor ripple current. Interleaved operation of the choppers can enable input and/or output ripple current cancellation. In some embodiments, the multi-pulse transformer is connected to a series connection of two three-phase diode bridges. Connecting the multi-pulse transformer to a series connection of two three-phase diode bridges can enable a reduction in ripple current ratings of the capacitor and/or secondary windings, resulting in a decrease in the size and weight of the transformer and/or dc bus capacitance. In some embodiments, the inductors are coupled, e.g. wound around a common magnetic core. Using coupled inductors in the plasma power supply can result in reduced size, weight, and/or ease of assembly of the power supply.

In one aspect, the invention features a plasma arc cutting system. The plasma arc cutting system includes a power supply configured to support generation of a plasma arc. The power supply includes a multi-pulse transformer and/or a plurality of semiconductor switches directly connected to a bank of capacitors. The power supply includes a thermal regulation system connected to the power supply and configured to cool the multi-pulse transformer. The thermal regulation system includes a cold plate in direct contact with the semiconductor devices and/or the capacitors. The thermal regulation system also includes a fluid conduit disposed within the cold plate. The thermal regulation system also includes a pump connected to the conduit and configured to direct a coolant fluid through the conduit. The power supply has at least one of the following operating requirements: (i) a weight to power ratio of approximately 22.4 pounds per kilowatt; (ii) a volume to power ratio of approximately 1366 cubic inches per kilowatt; (iii) an average semiconductor device case temperature of approximately 100 degrees Centigrade during a cutting operation; (iv) a maximum transformer temperature during a cutting operation of about 133 degrees Centigrade.

In some embodiments, the power supply has at least two of the operating requirements. In some embodiments, the power supply has at least three of the operating requirements. In some embodiments, the power supply has all four of the operating requirements. In some embodiments, the power supply includes a plurality of inductors. In some embodiments, each inductor is connected in series to a distinct semiconductor switch. In some embodiments, each semiconductor switch comprises an insulated gate bipolar transistor. In some embodiments, each inductor is mounted and/or wound on a common magnetic core. In some embodiments, the thermal regulation system further includes a set of fans connected to the power supply and/or a set of baffles connected to the power supply, the fans and baffles oriented to cool at least one of the transformer and the inductors.

In some embodiments, the transformer is directly connected to a plurality of rectifiers. In some embodiments, the rectifiers are connected to each other in series. In some embodiments, each rectifier includes a three-phase diode bridge. In some embodiments, the bank of capacitors includes four direct current bus capacitors. In some embodiments, the transformer is a 12-pulse transformer.

In another aspect, the invention features a plasma cutting system. The plasma cutting system includes a power supply capable of generating a plasma arc. The power supply includes a plurality of semiconductor switches. The power supply includes a plurality of inductors electrically connected to the plurality of semiconductor switches. Each semiconductor switch is electrically connected to a distinct inductor of the plurality of inductors. The plurality of semiconductor switches is configured to operate in an interleaved switching mode. The power supply includes a multi-pulse transformer electrically connected to a plurality of rectifiers. The plurality of rectifiers is connected in series and electrically connected to the plurality of semiconductor switches. The plasma cutting system also includes a liquid cooling system connected to the power supply and configured to thermally regulate the plurality of semiconductor switches. The liquid cooling system includes a cold plate. A coolant channel is formed within the cold plate.

In some embodiments, the power supply has at least one of the following operating requirements: (i) a weight to power ratio of approximately 22.4 pounds per kilowatt; (ii) a volume to power ratio of approximately 1366 cubic inches per kilowatt; (iii) an average semiconductor device case temperature of approximately 100 degrees Centigrade during a cutting operation; (iv) a maximum transformer temperature during a cutting operation of about 133 degrees Centigrade. In some embodiments, the power supply meets at least two of the operating requirements. In some embodiments, the power supply meets at least three of the operating requirements. In some embodiments, the power supply meets all of the operating requirements. In some embodiments, a plasma torch is operably connected to the power supply.

In some embodiments, the power supply includes a plurality of panels defining an interior surface of the power supply. In some embodiments, the power supply includes a set of baffles mounted on the interior surface of the power supply and oriented to direct an air flow inside the power supply toward the multi-pulse transformer. In some embodiments, the plurality of semiconductor switches is wired directly to a bank of capacitors. In some embodiments, the bank of capacitors comprises four direct current bus capacitors. In some embodiments, the coolant channel comprises a conduit. In some embodiments, the coolant channel forms a serpentine configuration. In some embodiments, the multi-pulse transformer is a 12-pulse transformer. In some embodiments, the inductors are mounted on a common magnetic core, the common magnetic core disposed within the power supply.

In another aspect, the invention features a plasma cutting system including a means for providing power to a plasma cutting torch using at least two interleaved choppers. Each of the interleaved choppers is connected to a distinct inductor. The plasma cutting system also includes means for liquid cooling of the interleaved choppers. The means for providing power is characterized by at least one of the following: (i) a weight to power ratio of approximately 22.4 pounds per kilowatt; (ii) a volume to power ratio of approximately 1366 cubic inches per kilowatt; (iii) an average semiconductor device case temperature of approximately 100 degrees Centigrade during operation; (iv) a maximum transformer temperature during a cutting operation of about 133 degrees Centigrade. In some embodiments, the plasma cutting system is characterized by at least two of the following: (i) a weight to power ratio of approximately 22.4 pounds per kilowatt; (ii) a volume to power ratio of approximately 1366 cubic inches per kilowatt; (iii) an average semiconductor device case temperature of approximately 100 degrees Centigrade during a cutting operation; (iv) a maximum transformer temperature during a cutting operation of about 133 degrees Centigrade. In some embodiments, the plasma cutting system is characterized by at least three of the following: (i) a weight to power ratio of approximately 22.4 pounds per kilowatt; (ii) a volume to power ratio of approximately 1366 cubic inches per kilowatt; (iii) an average semiconductor device case temperature of approximately 100 degrees Centigrade during a cutting operation; (iv) a maximum transformer temperature during a cutting operation of about 133 degrees Centigrade. In some embodiments, the plasma cutting system is characterized by at all of the following: (i) a weight to power ratio of approximately 22.4 pounds per kilowatt; (ii) a volume to power ratio of approximately 1366 cubic inches per kilowatt; (iii) an average semiconductor device case temperature of approximately 100 degrees Centigrade during a cutting operation; (iv) a maximum transformer temperature during a cutting operation of about 133 degrees Centigrade.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
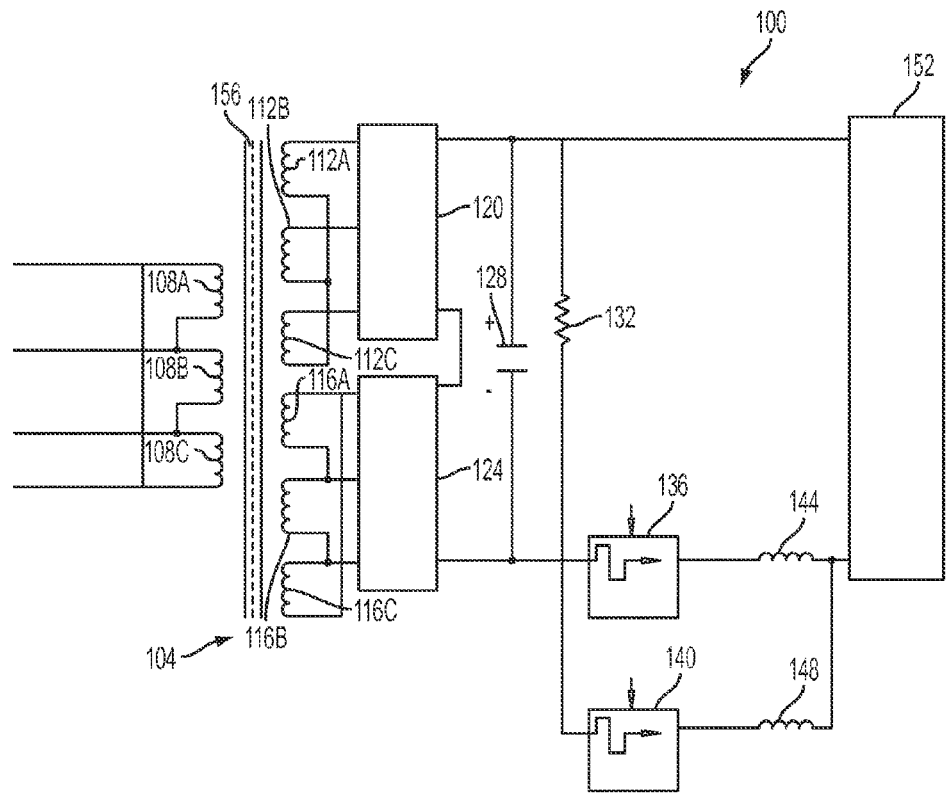
FIG. 1 is an electrical schematic diagram of a power circuit for a plasma power supply, according to an illustrative embodiment of the invention.

FIG. 1 is an electrical schematic diagram of a power circuit 100 for a plasma power supply, according to an illustrative embodiment of the invention. The power circuit 100 includes a transformer 104. The transformer 104 can be a multi-pulse transformer and/or have a multi-phase input line. In some embodiments, the transformer 104 has a three-phase input line. In some embodiments, the transformer 104 is a six-pulse transformer or a twelve-pulse transformer. The transformer 104 includes primary windings 108A-108C, collectively the primary winding 108. The primary winding 108 can be arranged in a delta configuration. The transformer 104 includes secondary windings 112A-C, collectively the secondary star winding 112. The transformer 104 also includes secondary windings 116A-C, collectively the secondary delta winding 116. The secondary star winding 112 can be arranged in a wye configuration. The secondary delta winding 116 can be arranged in a delta configuration. The transformer 104 can include a magnetic core 156. The windings 108, 112, 116 can each be wound around the magnetic core 156.

The secondary star winding 112 is electrically connected to a first rectifier 120. The secondary delta winding 116 is electrically connected to a second rectifier 124. The rectifiers 120, 124 are connected to each other in series. The rectifiers 120, 124 can be three-phase rectifiers. Each of the rectifiers 120, 124 can include a three-phase diode bridge (not shown). Using three-phase diode bridges in the rectifiers 120, 124 can reduce the current in the secondary windings 112, 116.

The series connection of rectifiers 120, 124 is connected in parallel to a bank of capacitors 128. The bank of capacitors 128 can include a DC bus of capacitors. In some embodiments the bank of capacitors 128 includes four DC bus capacitors connected in parallel. In some embodiments, the capacitors can each have a working voltage of about 450 V and/or a capacitance of about 2200 μF. The capacitors can each be capable of handling about 16 $A_{rms}$ ripple current. The bank of capacitors 128 is connected in parallel to resistors 132. In some embodiments the resistors 132 are bleeder resistors. In some embodiments the resistors 132 provide timely discharge of the DC bus capacitors after the power circuit 100 is switched off (e.g. to prevent a potential shock hazard to the operator). The resistors 132 can be connected to each other in parallel. In some embodiments the resistors 132 include three power resistors. In some embodiments, each of the resistors 132 has a resistance of about 6.8 k ohms and a power rating of about 25 watts.

The resistors 132 are connected in parallel across capacitor bank 128. Each of the two choppers 136, 140 may include an insulated gate bipolar transistor (IGBT) and/or a diode. The choppers 136, 140 are electrically connected to each other in parallel. The chopper 136 can be connected in series to an inductor 144. The chopper 140 can be connected in series to an inductor 148. An inductance value of the inductor 148 can determine the arc load current ripple (e.g., a higher inductance implies a lower current ripple) and can be designed to carry an output current of the choppers 136, 140. In some embodiments, the inductors provide an inductance ranging from about 425 μH at a current of 100 A to about 1.8 mH at a current of about 130 A. The ripple current per chopper can peak at about 8 A. Interleaving the choppers 136, 140 can reduce the arc ripple current to peak at about 3 A when the current is about 200 A. The inductors 144, 148 can each be electrically connected to a load 152, e.g. a plasma torch. In some embodiments, the load 152 can be between about 3 kW to 120 kW.

In some embodiments, using a multi-pulse transformer allows the power circuit 100 to meet or exceed power quality standards, e.g. as defined by power factor benchmarks and/or benchmarks for total harmonic distortion (THD) of input current. In some embodiments the power circuit 100 has a power factor of 0.98 at 33 kW. In some embodiments the power circuit 100 has a THD of about 13% at 33 kW. In some embodiments, the power circuit 100 permits use of a smaller transformer 104 as compared with previous power circuits. In some embodiments, using multi-pulse (e.g. 10-pulse, 12-pulse, 18-pulse, 20-pulse, etc.) diode bridges permits (i) the ripple current ratings of the capacitors 128 to be reduced; (ii) the size and/or weight of the transformer 104 to be reduced; and/or (iii) the DC bus capacitance requirement of the transformer 104 to be decreased.

In some embodiments, the choppers 136, 140 operate in an interleaved fashion, e.g. the operation of one IGBT is synchronized with the other. In some embodiments connecting the choppers 136, 140 to distinct inductors 144, 148 enables interleaved operation. Operating the choppers 136, 140 in interleaved mode using the single bank of capacitors 128 can enable a significant reduction of ripple current in the capacitors. Interleaved operation can permit ripple current cancellation in both the input and output current of the chopper, enabling further reduction of the size and/or weight of electrical components (e.g. the inductors 144, 148 and/or capacitors in the bank of capacitors 128). In some embodiments current flowing through the secondary windings 112, 116 can be lower by comparison to prior art technologies.

In some embodiments the present invention can utilize fewer electronic components by comparison to past technologies, resulting in less bulk, cost and/or design complexity. Table 1 shows an exemplary comparison of the electronic components of the present invention to those of past technologies.

TABLE 1

Comparison of component parts of an old technology vs. the current technology.

| Component | Old Technology | Current Technology |
|---|---|---|
| IGBTs | 4 | 2 |
| DC Bus Capacitors | 8 | 4 |
| Power Resistors | 6 | 3 |
| Fans | 4 | 0 |
| Heat sinks/cold plate | 2 (heat sinks) | 1 (cold plate) |
| DC Bus Capacitor support plate | 2 | 1 |
| PCB assemblies | 4 | 1 |

Figure 2:
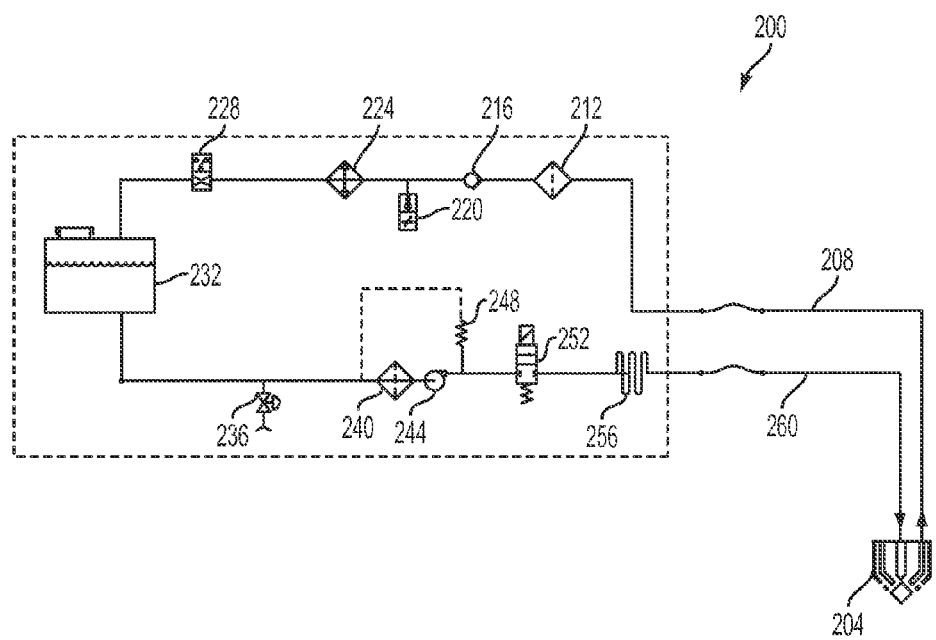
FIG. 2 is a block diagram of a power circuit cooling system including a cold plate, according to an illustrative embodiment of the invention.

FIG. 2 is a block diagram of a power circuit cooling system 200 including a cold plate 256, according to an illustrative embodiment of the invention. The cooling system 200 includes a fluid flow path that allows a cooling fluid to cycle around the cooling system 200 and/or cool several components of a plasma cutting system (e.g. the electronic components of power supply 100 as described above in reference to FIG. 1, the power leads 208, 260 as described below, and/or a torch 204). The fluid flow path can be defined by hosing, piping, and/or another structure suitable for containing fluid. In some embodiments the cooling fluid is 30% propylene glycol. In some embodiments the cooling fluid is 30% ethylene glycol, ionized water, and/or tap water.

The fluid flow path can include power leads 208, 260 that each run to the torch 204. The power leads 208, 260 can be about 25 to 100 feet in length. The fluid can contact an external surface of the leads 208, 260. Fluid flowing toward the torch 204 can flow over the external surface of lead 260 into the torch 204. Fluid flowing away from the torch 204 can flow over the external surface of the lead 208.

Fluid flowing away from the torch 204 can pass through a fine filter 212. The fine filter 212 can remove impurities and particulates from the coolant fluid returning from the torch 204. The fluid flows from the fine filter 212 to a check valve 216. The check valve 216 permits fluid to flow only in one direction, e.g. in a counter-clockwise direction as shown in FIG. 2. The fluid flows from the check valve 216 to a thermistor 220. The thermistor 220 can have a negative temperature coefficient of resistance (e.g. the thermistor resistance decreases with an increase in temperature). In some embodiments, the critical temperature is about 185 degrees Fahrenheit (e.g. a temperature of the inlet coolant to the heat exchanger 224). In some embodiments, when the thermistor 220 reaches the critical temperature, the system 200 is configured to shut the power supply down and provide a coolant over-temperature fault update to the operator.

The fluid flows from the thermistor 220 to a heat exchanger 224. The heat exchanger 224 can cool the coolant fluid via methods known in the art. In some embodiments, a liquid-air, cross-flow, compact fin heat exchanger is used. The heat exchanger 224 can include a 10-pass circular cross-sectional copper tube through which the hot coolant flows. The coolant can be forced air cooled via a fan that blows air crosswise through fins attached to the tube. The heat exchanger 224 is designed to cool the liquid sufficiently such that the torch 204 and/or semiconductor devices of the choppers 136, 140 operate within their specified temperatures under worst case operating conditions.

The fluid flows from the heat exchanger 224 to a flow switch 228. The flow switch 228 can detect blockages in the cooling loop (e.g. due to deposition as a result of particulates in the coolant and/or reduction in pump efficiency due to its aging, which can reduce the coolant flow rate and increase the coolant's temperature). The flow switch 228 cause the system 200 to act in response to the fluid flow, e.g. to shut the power supply down due to low coolant flow. In some embodiments, the fluid flow is shut down when the coolant flow rate is about 0.6 gallons per minute or lower. The fluid flows from the flow switch 228 to a reservoir 232. The reservoir 232 is a source and/or container for the fluid. The reservoir 232 can be contained within the power supply. The reservoir 232 can be about 15 inches in height, 10 inches in depth and/or 6 inches in width. The reservoir 232 can include 0.15 inch thick walls and/or be made of polyethylene.

The fluid flow path can include a drain 236. The drain 236 can be used to drain fluid for cooling loop maintenance. The fluid can flow past the drain 236 through a coarse filter 240. The coarse filter 240 can filter coarse particles out of the fluid. The fluid can flow from the coarse filter 240 to a pump 244. The pump 244 can maintain a fluid flow around the cooling system 200 according to methods known in the art. The fluid flow path can include an internal bypass 248. The internal bypass 248 allows fluid to bypass the pump 244 and/or the coarse filter 240 in case the pump pressure exceeds its shut-off head pressure rating, thereby preventing failure or breakage of the pump 244 and/or other coolant loop components. Fluid flowing through the internal bypass 248 flows through the coarse filter 240 and/or the pump 244 and circumvents the rest of the loop completely. Fluid exiting the pump 244 can also flow to the shut-off valve 252. The shut-off valve 252 can be configured to stop the flow of fluid, e.g. to prevent coolant leakage as may happen during torch consumable change or when the torch 204 is replaced.

Fluid leaving the shut-off valve 252 can flow to the cold plate 256. The cold plate 256 can be in contact with the electrical components of the plasma power supply 100, e.g. some or all of the electrical components described above in reference to FIG. 1. Using the cold plate 256 in the cooling system 200 can allow the cooling system 200 to utilize more of the cooling potential of the heat exchanger 224. Fluid leaving the cold plate 256 can flow over the power lead 260 to the torch 204. The fluid can cycle continuously through the system 200 via the above-described fluid flow path during operation of the system.

Figure 3B:
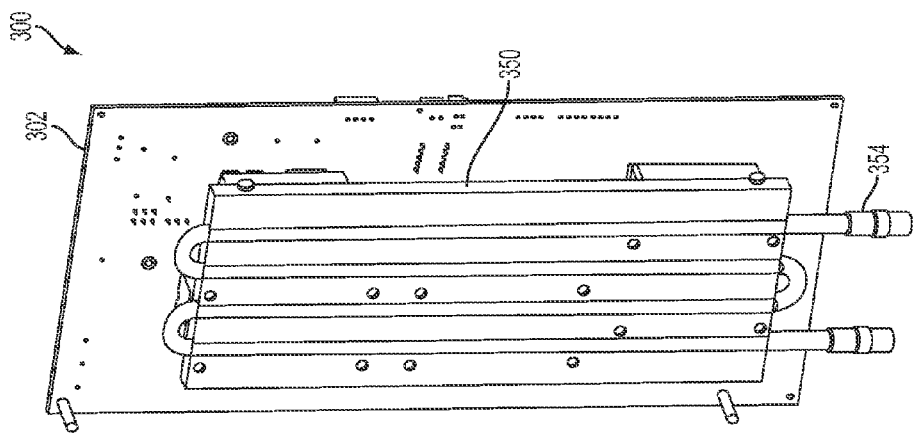
FIG. 3B is a rear view of a liquid-cooled power circuit for a plasma power supply, according to an illustrative embodiment of the invention.
Figure 3A:
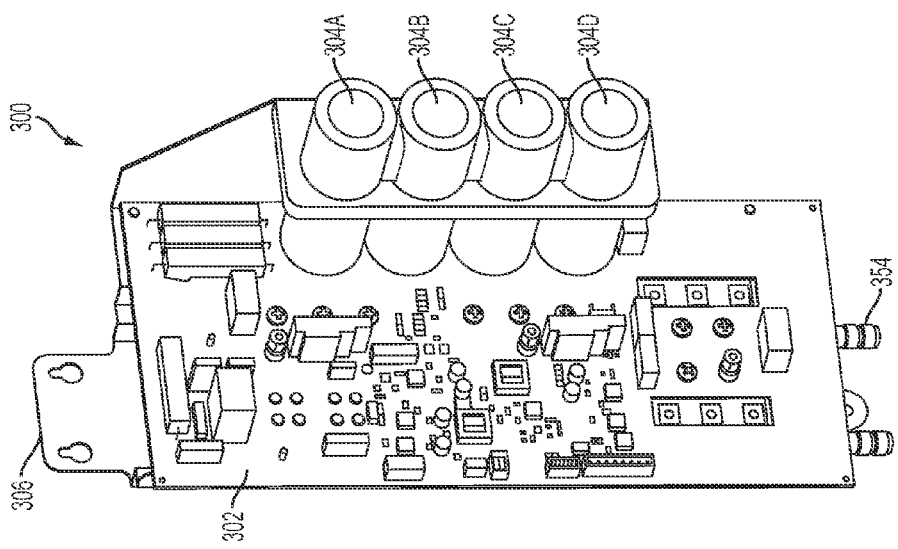
FIG. 3A is a front view of a liquid-cooled power circuit for a plasma power supply, according to an illustrative embodiment of the invention.

FIG. 3A is a front view of a liquid-cooled power circuit 300 for a plasma power supply, according to an illustrative embodiment of the invention. The power circuit 300 includes a printed circuit board (PCB) 302. The PCB 302 includes capacitors 304A-D, collectively the bank of capacitors 304 (e.g. bank of capacitors 128 as described above in reference to FIG. 1). The PCB 302 is attached to a mounting structure 306 that allows the PCB to be mounted to the plasma power supply.

FIG. 3B is a rear view of a liquid-cooled power circuit 300 for a plasma power supply, according to an illustrative embodiment of the invention. A cold plate 350 (e.g. the cold plate 256 described above in reference to FIG. 2) is in close proximity to the PCB 302. The cold plate 350 can include piping 354. The piping 354 can define a fluid flow path (e.g. conduit or channel) through the cold plate 350. In some embodiments the piping 354 is made of copper tubing or aluminum tubing. In some embodiments the piping 354 has a serpentine configuration. In some embodiments the cold plate 350 results in improved cooling and/or improved power performance over known power supplies. In some embodiments the cold plate 350 permits fewer component parts to be used (e.g. permits a reduction in fans and/or heat sinks as described above in reference to FIG. 1).

Figure 4A:
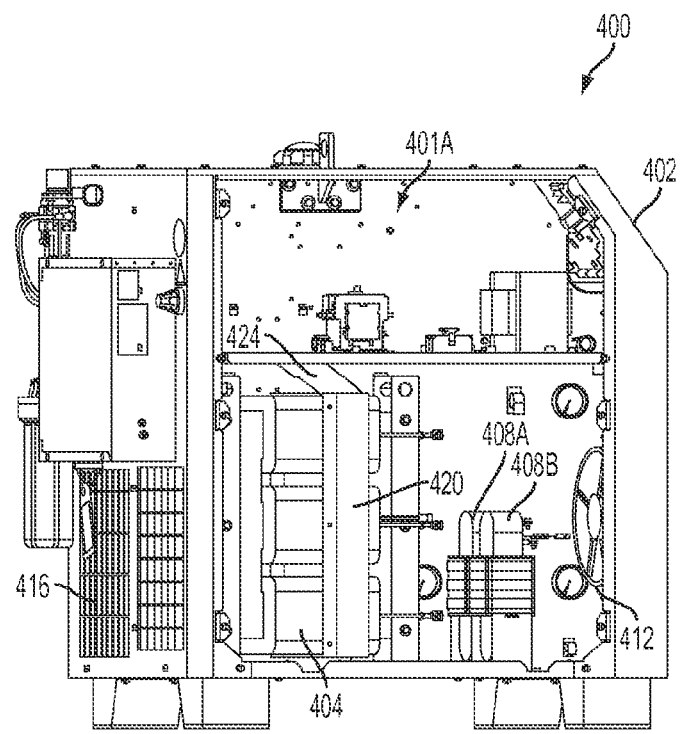
FIGS. 4A-4B are side-view illustrations of opposite sides of a plasma power supply with internal components visible, according to an illustrative embodiment of the invention.
Figure 4B:
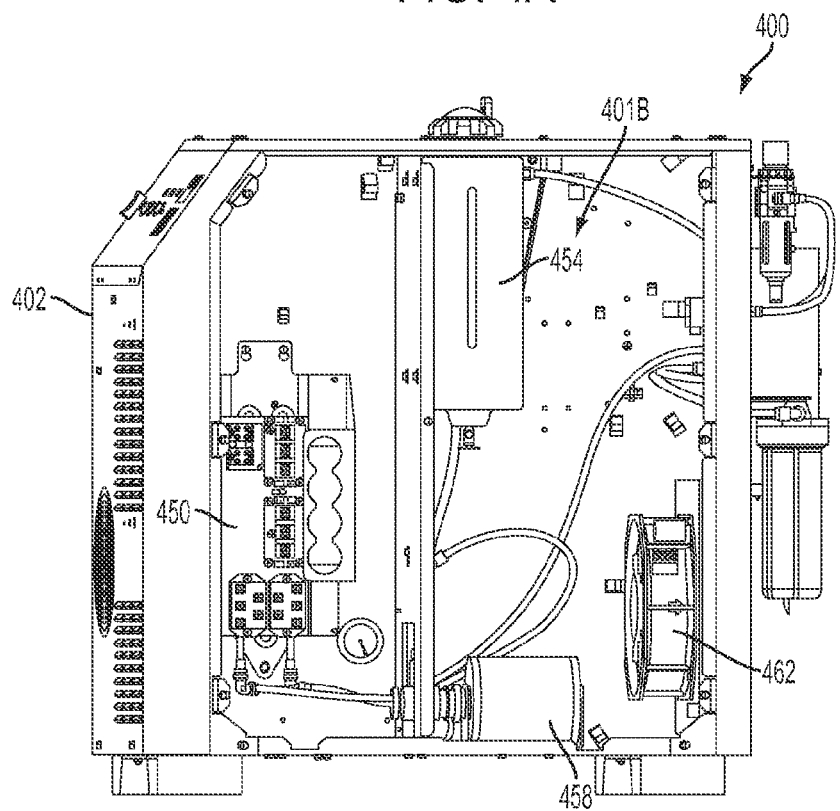

FIGS. 4A-4B are side-view illustrations of opposite sides of a plasma power supply 400 with internal components visible, according to an illustrative embodiment of the invention. The power supply 400 includes a casing 402. The casing 402 can define two chambers 401A, 401B, each of which houses internal components of the power supply 400. The side-view illustration in FIG. 4A shows the first chamber 401A. The side-view illustration in FIG. 4B shows the second chamber 401B.

Referring now to FIG. 4A, the first chamber 401A includes a transformer 404, e.g. transformer 104 as described above in reference to FIG. 1. The first chamber 401A includes inductors 408A, 408B, e.g. inductors 144, 148 as described above in reference to FIG. 1. The first chamber 401A includes a cooling fan 412 and/or a rear grill 416. The cooling fan 412 and/or the rear grill 416 are attached to the casing 402.

The first chamber 401A includes baffles 420, 424. The baffles 420, 424 are attached to the casing 402 (e.g. an interior surface of the casing 402). The baffles 420, 424 can be made of a flexible material, e.g. a polycarbonate material about 0.02 inches in thickness. The baffles 420, 424 can be configured to funnel air flow provided by the cooling fan 412 directly into a cooling duct of the transformer 404 and/or provide improved cooling in the first chamber 401A. The baffles 420, 424 can be configured to ensure that minimal air flows outside of a desired direction (e.g. a direction not substantially toward the transformer 404 and/or the inductors 408A, 408B). The baffles 420, 424 can be configured to ensure that the first chamber 401A is easily assembled. The baffle 424 can rest on top of the transformer 404 and/or flexibly adjust to a given height of the transformer 404. The improved cooling provided by baffles 420, 424 can result in a reduction in size and/or weight of the transformer 404 and/or inductors 408A, 408B. The inductors 408A, 408B can be coupled, e.g. can be constructed around a common core. Constructing the inductors 408A, 408B around a common core can reduce the total size and/or weight of the plasma power supply.

Referring now to FIG. 4B, the second chamber 401B includes a cold plate 450 (e.g. cold plate 256 as described above in reference to FIG. 2). The second chamber 401B includes a reservoir (e.g. reservoir 232 as described above in reference to FIG. 2). The second chamber 401B includes a pump motor assembly 458, e.g. including pump 244 as described above in reference to FIG. 2). The second chamber 401B includes a heat exchanger fan 462 for cooling the heat exchanger.

In some embodiments the power rating for the power supply is about 33 kilowatts. In some embodiments the weight of the power supply is about 740 pounds. In some embodiments the dimensions of the power supply are about 40.14 inches in height, 27.23 inches in width and 41.23 inches in depth (e.g. the volume is about 45,065 cubic inches). In some embodiments the power supply has a first operating requirement that the ratio of weight to power rating for the power supply is about 22.42 pounds per kilowatt, optionally about 20 to 25 pounds per kilowatt, optionally about 15 to 30 pounds per kilowatt. In some embodiments the power supply has a second operating requirement that the ratio of power rating to volume for the power supply is about 1365.6 cubic inches per kilowatt, optionally about 1350 to 1400 cubic inches per kilowatt, optionally about 1300 to 1500 cubic inches per kilowatt. In some embodiments the power supply has a third operating requirement that the average case temperature of the semiconductor devices during a cutting operation is about 100 degrees Centigrade, optionally about 95 to 105 degrees Centigrade, optionally about 90 to 110 degrees Centigrade (as shown in greater detail below with reference to FIG. 5A). In some embodiments the power supply has a fourth operating requirement that the maximum transformer temperature during a cutting operation is about 133 degrees Centigrade, optionally about 130 to 140 degrees Centigrade, optionally about 125 to 145 degrees Centigrade (as shown in greater detail below with reference to FIG. 5B). In some embodiments the power supply has at least two of the operating requirements. In some embodiments the power supply has at least three of the operating requirements. In some embodiments the power supply has all of the operating requirements.

Figure 5A:
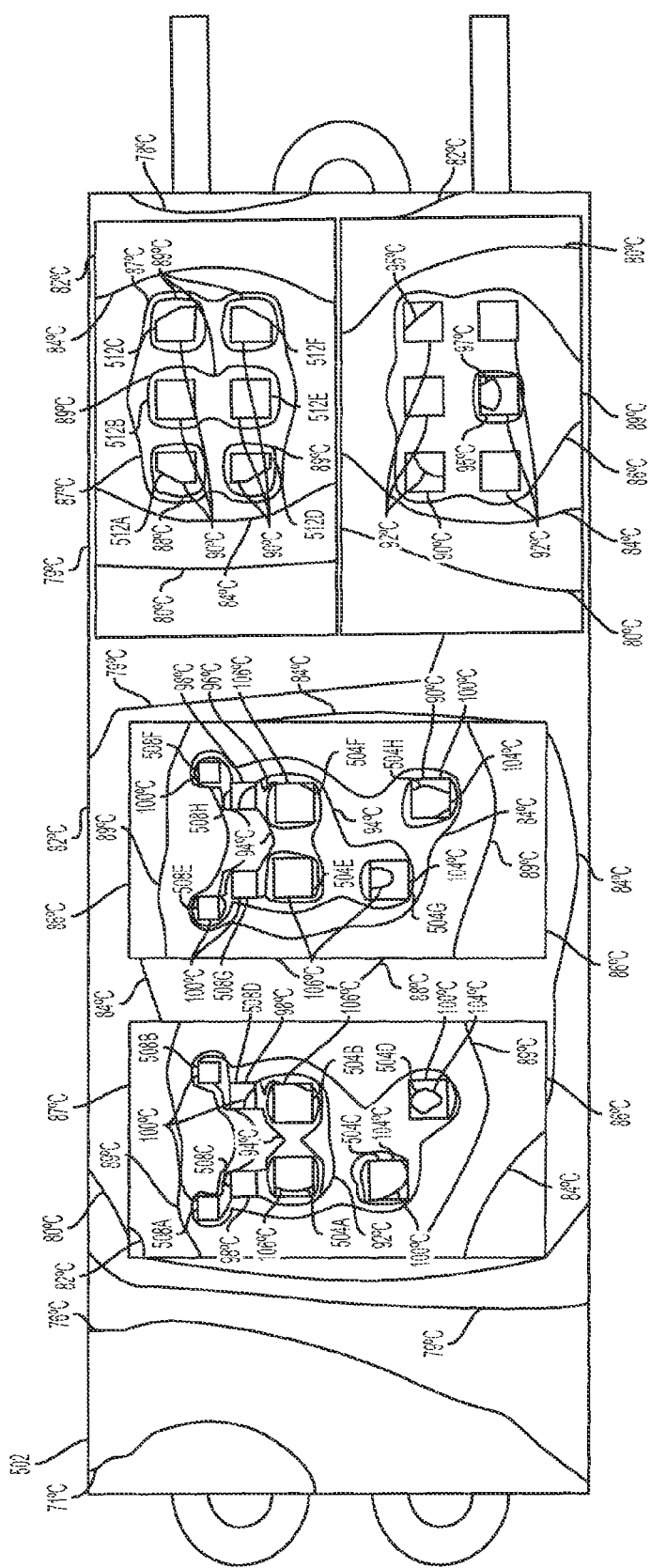
FIGS. 5A-5B show temperature profile simulations for internal components of a plasma power supply, according to an illustrative embodiment of the invention.
Figure 5B:
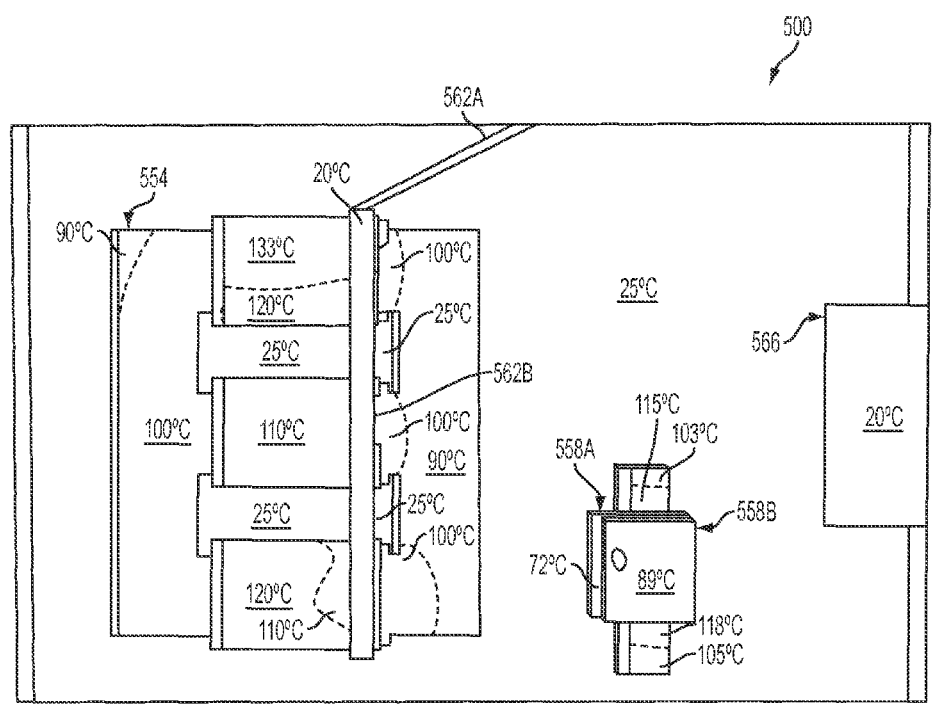

FIGS. 5A-5B show temperature profile simulations for internal components of a plasma power supply, according to an illustrative embodiment of the invention. FIG. 5A shows a temperature profile simulation for a cold plate 502 (e.g. cold plate 256 as shown above in reference to FIG. 2). Approximate temperatures are shown for several locations on the cold plate 502 in close proximity and/or contact with certain electronic components of the power circuit. Lines of constant temperature are depicted and collectively illustrate a temperature gradient of the cold plate 502 during operation. The IGBTs are located in and/or near regions 504A-504H. The diodes are located in and/or near regions 508A-508H. The diode bridges are located in and/or near regions 512A-512F.

The average case temperature of the IGBTs during operation (e.g. the average temperature in locations 504A-504H) can be about 100 degrees Centigrade, optionally about 95 to 105 degrees Centigrade, optionally about 90 to 100 degrees Centigrade. The average temperature of the diodes during operation (e.g. the average temperature in and/or near regions 508A-508H) can be about 100 degrees Centigrade, optionally about 95 to 105 degrees Centigrade, optionally about 90 to 100 degrees Centigrade. The average temperature during operation of diode bridges (e.g. the average temperature in and/or near regions 512A-512F) can be about 90 degrees Centigrade, optionally about 85 to 95 degrees Centigrade, optionally about 80 to 90 degrees Centigrade. In some embodiments, the chopper semiconductor devices (e.g. the IGBTs and the diodes) attain an average case temperature of about 100 degrees Centigrade, optionally about 95 to 105 degrees Centigrade, optionally about 90 to 110 degrees Centigrade. In some embodiments, a chopper semiconductor device case temperature of 100 degrees Centigrade is estimated under the following conditions: (1) the coolant used is 30% propylene glycol; (2) the coolant flow rate is about 0.8 to 1.2 gallons per minute; (3) the load power is about 33 kW; (4) the coolant cold plate inlet temperature is about 70 degrees Centigrade; (5) the coolant cold plate exit temperature is about 77 degrees Centigrade; (5) the input voltage is about 576V (e.g. about +20% for a 480V system).

FIG. 5B shows a temperature simulation for the interior of the power supply 500. The power supply 500 includes a transformer 554, inductors 558A, 558B, baffles 562A, 562B, and a cooling fan 566. Approximate temperatures are shown for several regions of the power supply 500. In some embodiments, the maximum temperature that the transformer 554 attains during operation is about 133 degrees Centigrade. In some embodiments, the transformer 554 attains a maximum temperature in the range of about 130-140 degrees Centigrade. In some embodiments, the transformer 554 attains a maximum temperature in the range of about 125 to 145 degrees Centigrade.

While the invention has been particularly shown and described with reference to specific preferred embodiments, it should be understood by those skilled in the art that various changes in form and detail may be made therein without departing from the spirit and scope of the invention as defined by the following claims.

What is claimed is:

1. A plasma arc cutting system comprising:
    a power supply configured to support generation of a plasma arc, the power supply including a multi-pulse transformer and a plurality of semiconductor switches directly connected to a bank of capacitors; and
    a thermal regulation system connected to the power supply and configured to cool the multi-pulse transformer, the thermal regulation system further comprising:
        a cold plate in contact with the semiconductor switches;
        a fluid conduit disposed within the cold plate; and
        a pump connected to the conduit and configured to direct a coolant fluid through the conduit,
    wherein the power supply has at least one of the following operating requirements:
        (i) a weight to power ratio of 22.4 pounds per kilowatt;
        (ii) a volume to power ratio of 1366 cubic inches per kilowatt;
        (iii) an average chopper semiconductor device case temperature of 100 degrees Centigrade during a cutting operation;
        (iv) a maximum transformer temperature of about 133 degrees Centigrade during a cutting operation.

2. The plasma arc cutting system of claim 1 wherein the power supply has at least two of the operating requirements.

3. The plasma arc cutting system of claim 1 wherein the power supply further comprises a plurality of inductors, each inductor connected in series to a distinct semiconductor switch.

4. The plasma arc cutting system of claim 3 wherein each semiconductor switch comprises an insulated gate bipolar transistor.

5. The plasma arc cutting system of claim 3 wherein each inductor is connected to a common coil.

6. The plasma arc cutting system of claim 3 wherein each inductor is mounted on a common magnetic core.

7. The plasma arc cutting system of claim 3 wherein the thermal regulation system further comprises a set of fans connected to the power supply and a set of baffles connected to the power supply, the fans and baffles oriented to cool at least one of the transformer and the inductors.

8. The plasma arc cutting system of claim 1 wherein the transformer is directly connected to a plurality of rectifiers, the rectifiers connected to each other in series.

9. The plasma arc cutting system of claim 8 wherein each rectifier includes a three-phase diode bridge.

10. The plasma arc cutting system of claim 1 wherein the bank of capacitors comprises four direct current bus capacitors.

11. The plasma arc cutting system of claim 1 wherein the transformer is a 12-pulse transformer.

12. A plasma cutting system comprising:
  means for providing power to a plasma cutting torch using at least two interleaved choppers, each of the interleaved choppers connected to a distinct inductor; and
  means for liquid cooling of the interleaved choppers,
  wherein the means for providing power is characterized by at least one of the following:
    (i) a weight to power ratio of 22.4 pounds per kilowatt;
    (ii) a volume to power ratio of 1366 cubic inches per kilowatt;
    (iii) an average chopper semiconductor device case temperature of 100 degrees Centigrade during operation;
    (iv) a maximum transformer temperature of about 133 degrees Centigrade during a cutting operation.

13. The plasma cutting system of claim 12 wherein the means for providing power is characterized by at least two of the following:
  (i) a weight to power ratio of 22.4 pounds per kilowatt;
  (ii) a volume to power ratio of 1366 cubic inches per kilowatt;
  (iii) an average chopper semiconductor device case temperature of 100 degrees Centigrade during a cutting operation;
  (iv) a maximum transformer temperature of about 133 degrees Centigrade during a cutting operation.

\* \* \* \* \*